United States Patent
Park et al.

(10) Patent No.: US 10,029,215 B2
(45) Date of Patent: Jul. 24, 2018

(54) GRAPHENE OXIDE NANOCOMPOSITE MEMBRANE FOR GAS SEPARATION, REDUCED GRAPHENE OXIDE NANOCOMPOSITE MEMBRANE AND METHOD FOR MANUFACTURING THE SAME

(71) Applicant: IUCF-HYU (INDUSTRY-UNIVERSITY COOPERATION FOUNDATION HANYANG UNIVERSITY), Seoul (KR)

(72) Inventors: Ho Bum Park, Seoul (KR); Hyo Won Kim, Seoul (KR); Myung Jin Yoo, Seoul (KR); Byung Min Yoo, Seongnam-si (KR); Byungkook Ahn, Goyang-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 37 days.

(21) Appl. No.: 15/123,975

(22) PCT Filed: Mar. 6, 2015

(86) PCT No.: PCT/KR2015/002155
§ 371 (c)(1),
(2) Date: Sep. 6, 2016

(87) PCT Pub. No.: WO2015/133848
PCT Pub. Date: Sep. 11, 2015

(65) Prior Publication Data
US 2017/0014778 A1    Jan. 19, 2017

(30) Foreign Application Priority Data

Mar. 7, 2014  (KR) .................. 10-2014-0027162
Mar. 26, 2014  (KR) .................. 10-2014-0035491

(51) Int. Cl.
*B01D 53/22* (2006.01)
*B01D 69/12* (2006.01)
(Continued)

(52) U.S. Cl.
CPC .......... *B01D 69/12* (2013.01); *B01D 53/228* (2013.01); *B01D 67/0079* (2013.01);
(Continued)

(58) Field of Classification Search
CPC ...... B01D 69/12; B01D 69/02; B01D 71/024; B01D 67/0079; B01D 2325/04;
(Continued)

(56) References Cited

U.S. PATENT DOCUMENTS 9,833,749 B2 *  12/2017  Park ................... B01D 71/024
2012/0255899 A1  10/2012  Choi et al.
(Continued)

FOREIGN PATENT DOCUMENTS

KR  1020110110067  10/2011
KR  1020120115821  10/2012
(Continued)

OTHER PUBLICATIONS

Li, et al., "Ultrathin, Molecular-Sieving Graphene Oxide Membranes for Selective Hydrogen Separation", Science, vol. 342, pp. 95-99, Oct. 4, 2013.
(Continued)

*Primary Examiner* — Anthony Shumate
(74) *Attorney, Agent, or Firm* — Duane Morris LLP; J. Rodman Steele, Jr.; Gregory M. Lefkowitz

(57) ABSTRACT

The present invention relates to a technology for manufacturing a nanocomposite membrane comprising a graphene oxide coating layer with a thickness of 1 nm to 50 nm, which is formed on various supports and has nanopores, and a reduced graphene oxide nanocomposite membrane, and applying the membranes to gas separation. The graphene oxide nanocomposite membrane for gas separation of the present invention has excellent gas permeability and selectivity at the same time, and especially, excellent hydrogen gas permeability and hydrogen gas selectivity compared with carbon dioxide, and the reduced graphene oxide nanocomposite membrane has remarkably enhanced hydrogen gas permeability and hydrogen gas selectivity compared with carbon dioxide, and thus the membranes are applicable as a gas separation membrane in an industrial field involving a hydrogen separation process. Furthermore, a graphene oxide nanocomposite membrane for gas separation can be provided, in which strong binding force between a support and a graphene oxide coating layer is induced by modifying surfaces of various supports and thus the graphene oxide coating layer is not easily delaminated.

10 Claims, 12 Drawing Sheets

(51) Int. Cl.
　　*B01D 69/02*　　(2006.01)
　　*B01D 69/10*　　(2006.01)
　　*B01D 71/02*　　(2006.01)
　　*B01D 67/00*　　(2006.01)

(52) U.S. Cl.
　　CPC ......... *B01D 67/0093* (2013.01); *B01D 69/02* (2013.01); *B01D 69/105* (2013.01); *B01D 71/021* (2013.01); *B01D 71/024* (2013.01); *B01D 67/0069* (2013.01); *B01D 2325/04* (2013.01)

(58) Field of Classification Search
　　CPC ............. B01D 67/0069; B01D 53/228; B01D 69/105; B01D 71/021
　　See application file for complete search history.

(56) References Cited

U.S. PATENT DOCUMENTS

| | | | |
|---|---|---|---|
| 2013/0079552 A1* | 3/2013 | Lee | B01D 69/08 562/488 |
| 2013/0270188 A1* | 10/2013 | Karnik | B01D 53/228 210/650 |
| 2013/0305927 A1* | 11/2013 | Choi | B01D 71/021 96/13 |
| 2014/0124176 A1* | 5/2014 | Zhamu | H01L 23/373 165/133 |
| 2014/0127488 A1* | 5/2014 | Zhamu | C01B 31/04 428/216 |
| 2014/0199777 A2* | 7/2014 | Ruiz | B01D 39/00 436/174 |
| 2014/0353144 A1* | 12/2014 | Nakanishi | C25B 11/03 204/252 |
| 2015/0165385 A1* | 6/2015 | Oh | B01D 69/12 261/6 |
| 2015/0209734 A1* | 7/2015 | Chiu | C02F 1/44 210/641 |
| 2015/0218730 A1* | 8/2015 | Dang | D01F 1/10 524/609 |
| 2015/0231577 A1* | 8/2015 | Nair | B01D 71/024 210/640 |
| 2016/0051942 A1* | 2/2016 | Park | B01D 69/12 96/13 |
| 2016/0074814 A1* | 3/2016 | Park | B01D 69/12 210/500.33 |
| 2016/0354729 A1* | 12/2016 | Krishna | B01D 69/148 |

FOREIGN PATENT DOCUMENTS

| | | |
|---|---|---|
| KR | 1020130040738 | 4/2013 |
| KR | 1020130060133 | 6/2013 |
| KR | 20130128686 | 11/2013 |
| KR | 1020130128686 | 11/2013 |
| KR | 101421219 | 7/2014 |
| WO | 2011/066332 | 6/2011 |

OTHER PUBLICATIONS

Jeong, et al."Nitrogen-Doped Graphene for High Performance Ultracapacitors and the Importance of Nitrogen-Doped Sites at Basal-Planes", Nano Lett., 11 (6), pp. 2472-2477, May 19, 2011.

Kim, et al., "Selective Gas Transport Through Few-Layered Graphene and Graphene Oxide Membranes", Science, vol. 342, Issue 6154, pp. 91-95, Oct. 4, 2013.

Setiawan, et al., "23rd Annual Meeting of the North American Membrane Society", NAMS 2013, pp. 127, Jun. 11, 2013.

* cited by examiner

GRAPHENE OXIDE NANOCOMPOSITE MEMBRANE FOR GAS SEPARATION, REDUCED GRAPHENE OXIDE NANOCOMPOSITE MEMBRANE AND METHOD FOR MANUFACTURING THE SAME

CROSS-REFERENCE TO RELATED APPLICATIONS

This application is a § 371 national stage entry of International Application No. PCT/KR2015/002155, filed on Mar. 6, 2015, which claims priority to South Korean Patent Application No. 10-2014-0027162, filed on Mar. 7, 2014, and South Korean Patent Application No. 10-2014-0035491, filed on Mar. 26, 2014, the entire contents of which are incorporated herein by reference.

TECHNICAL FIELD

The present invention relates to a graphene oxide nanocomposite membrane for gas separation, a reduced graphene oxide nanocomposite membrane and a method for manufacturing the same. More specifically, the present invention relates to a technology for manufacturing a nanocomposite membrane comprising a graphene oxide coating layer with a thickness of 1 nm to 50 nm, which is formed on various supports and has nanopores, and a reduced graphene oxide nanocomposite membrane and applying the membranes to gas separation.

BACKGROUND ART

Recently, graphene, which has a single layer having a two-dimensional plane structure, exhibits excellent mechanical strength and thermal and chemical properties and can be produced into a thin film, has been highlighted and cases in which composite membranes are produced by transferring graphene to porous polymer supports are reported. Such a graphene-containing composite membrane can be used to separate oxygen from a mixed gas of nitrogen and oxygen to enrich oxygen or produce nitrogen, but it is disadvantageously inapplicable as a membrane for gas separation, because a graphene oxide membrane is formed by vacuum filtration and thus inevitably suffers from partial surface defects and has very low permeability and selectivity, in spite of the expectation of improvement in gas permeability and selectivity due to the thin film graphene (Patent Document 1).

In addition, application, to a chemical sensor or electrochemical double-layer capacitor, of a functionalized graphene-containing composite membrane having a coating layer coated with a functionalized graphene dispersion by vacuum filtration on a non-conductive porous polymer support is also well-known. However, applicability of this functionalized graphene-containing composite membrane to the membrane for gas separation is neither disclosed nor suggested. Even if the composite membrane is applied as a membrane for gas separation, the graphene oxide coating layer has a thickness of 50 to 500 nm and is too thick to use as a nano-scale thin film. For this reason, there is a limitation on improving permeability and selectivity of hydrogen by promoting permeation of hydrogen while preventing permeation of carbon dioxide, from a mixed gas of hydrogen and carbon dioxide (Patent Document 2).

In addition, research on incorporation of graphene oxide into a porous polymer support to improve permeability or selectivity to a certain gas mixture has been conducted, but a graphene oxide coating layer may be readily detached due to weak bonding force between the porous polymer support and the graphene oxide coating layer (Patent Document 3).

Meanwhile, a method of manufacturing a reduced graphene oxide film by reacting a graphene oxide film formed on a polyethylene terephthalate (PET) substrate at a temperature of 40° C. with a hydroiodic acid steam gas derived from a solution containing hydroiodic acid (HI) and acetic acid mixed in a ratio of 2:5 is well-known. However, it is not known that the composite membrane obtained by this method has a thickness of several nanometers and is thus applicable to a membrane for gas separation (Patent Document 4).

In addition, results of a variety of research on graphene/polymer nanocomposites containing graphene oxide or chemically or thermally reduced graphene oxide dispersed in various polymers are also well-known. However, a detailed description associated with effects of improving permeability of hydrogen and selectivity of hydrogen compared to carbon dioxide from the hydrogen/carbon dioxide mixed gas has not been reported yet. Meanwhile, it is not known that graphene oxide-based separation membranes developed to date are separation coating layers having a dense structure and are thus mainly applied as gas separation membranes for collecting carbon dioxide due to excellent permeability of carbon dioxide, and that the gas separation membranes are used for separating hydrogen from the hydrogen/carbon dioxide mixed gas due to limited methods of coating graphene oxide (Non-patent Document 1).

PRIOR ART DOCUMENT

Patent Document

Patent Document 1. US Patent Publication No. US 2012/0255899 A
Patent Document 2. PCT Patent Publication No. WO 2011/066332 A
Patent Document 3. Korean Patent Publication No. 10-2013-0128686
Patent Document 4. Korean Patent Publication No. 10-2011-0110067

Non-Patent Document

Non-patent Document 1. Hyunwoo Kim et al., Macromolecules. 43 (2010) 6515-6530

DISCLOSURE

Technical Problem

Therefore, it is one object of the present invention to provide a nanocomposite membrane including a graphene oxide coating layer having a thickness of 1 nm to 50 nm and nanopores, which is applicable to a gas separation process due to excellent gas permeability and selectivity, especially both excellent hydrogen gas permeability and selectivity of hydrogen gas compared to carbon dioxide, a reduced graphene oxide nanocomposite membrane and a method for manufacturing the same.

In addition, it is another object of the present invention to provide a graphene oxide nanocomposite membrane for gas separation in which strong bonding force between a support and a graphene oxide coating layer is induced by modifying surfaces of various supports and thus the graphene oxide coating layer is not easily delaminated.

Technical Solution

In accordance with one aspect of the present invention, the above and other objects can be accomplished by the provision of a graphene oxide nanocomposite membrane for gas separation including a support and a graphene oxide coating layer with a thickness of 1 nm to 50 nm disposed on the support and having nanopores.

The support may be surface-doped with nitrogen and may have a contact angle of 10 to 50°, a surface roughness of 0.1 to 5.0 nm and a surface charge of −20 to +20 mV.

The support may be a porous polymer support.

The porous polymer support may be selected from the group consisting of polysulfone, polyether sulfone, polyimide, polyether imide, polyamide, polyacrylonitrile, cellulose acetate, cellulose triacetate, and polyvinylidene fluoride.

The porous polymer support may have a pore size of 10 nm to 500 nm.

The graphene oxide may be functionalized graphene oxide in which a hydroxyl group, a carboxyl group, a carbonyl group or an epoxy group present in graphene oxide is converted into an ester group, an ether group, an amide group or an amino group.

The graphene oxide may have a size of 0.1 μm to 5 μm.

The nanopores may have a mean diameter of 0.5 nm to 2.0 nm.

The coating layer may include graphene oxide including a single layer or multiple layers.

The graphene oxide including a single layer may have a thickness of 0.6 nm to 1 nm.

In another aspect of the present invention, provided is a method of manufacturing a graphene oxide nanocomposite membrane for gas separation including i) preparing a dispersion of graphene oxide in distilled water, ii) treating the dispersion with an ultrasonic grinder for 0.1 to 6 hours, and iii) coating a support with the ultrasonicated solution to form a coating layer.

The method may further include treating the support with plasma and doping with nitrogen before forming the coating layer.

The graphene oxide may be functionalized graphene oxide in which a hydroxyl group, a carboxyl group, a carbonyl group or an epoxy group present in graphene oxide is converted into an ester group, an ether group, an amide group or an amino group.

The graphene oxide may have a size of 0.1 μm to 5 μm.

The dispersion may be a 0.01 to 0.5 wt % aqueous graphene oxide solution having a pH adjusted to 10.0 using a 1M aqueous sodium hydroxide solution.

The support may be a porous polymer support.

The porous polymer support may be selected from the group consisting of polysulfone, polyether sulfone, polyimide, polyether imide, polyamide, polyacrylonitrile, cellulose acetate, cellulose triacetate and polyvinylidene fluoride.

The porous polymer support may have a pore size of 10 nm to 500 nm.

The coating may be carried out by any one method selected from the group consisting of direct evaporation, transfer, spin coating and spray coating.

The spin coating may be conducted three to ten times.

The coating layer may include graphene oxide including a single layer or multiple layers.

The graphene oxide including a single layer may have a thickness of 0.6 nm to 1 nm.

In another aspect of the present invention, provided is a reduced graphene oxide nanocomposite membrane for gas separation produced by reducing the graphene oxide nanocomposite membrane by vapor reduction.

The vapor reduction may be carried out by feeding a solution containing hydroiodic acid (HI) and acetic acid mixed in a ratio of 2:5 to a reactor and reacting hydroiodic acid (HI) vapor with the graphene oxide nanocomposite membrane at 30 to 40° C. for 12 to 24 hours.

Effects of the Invention

The graphene oxide nanocomposite membrane for gas separation of the present invention has excellent gas permeability and selectivity at the same time, and especially, excellent hydrogen gas permeability and selectivity of hydrogen gas compared to carbon dioxide, and the reduced graphene oxide nanocomposite membrane is applicable as a membrane for gas separation in an industrial field involving a hydrogen separation process because it has remarkably enhanced hydrogen gas permeability and selectivity of hydrogen gas compared to carbon dioxide.

Furthermore, a graphene oxide nanocomposite membrane for gas separation can be provided, in which strong bonding force between a support and a graphene oxide coating layer is induced by modifying surfaces of various supports and thus the graphene oxide coating layer is not easily delaminated.

DESCRIPTION OF DRAWINGS

The above and other objects, features and other advantages of the present invention will be more clearly understood from the following detailed description taken in conjunction with the accompanying drawings, in which.

BEST MODE

Figure 1:
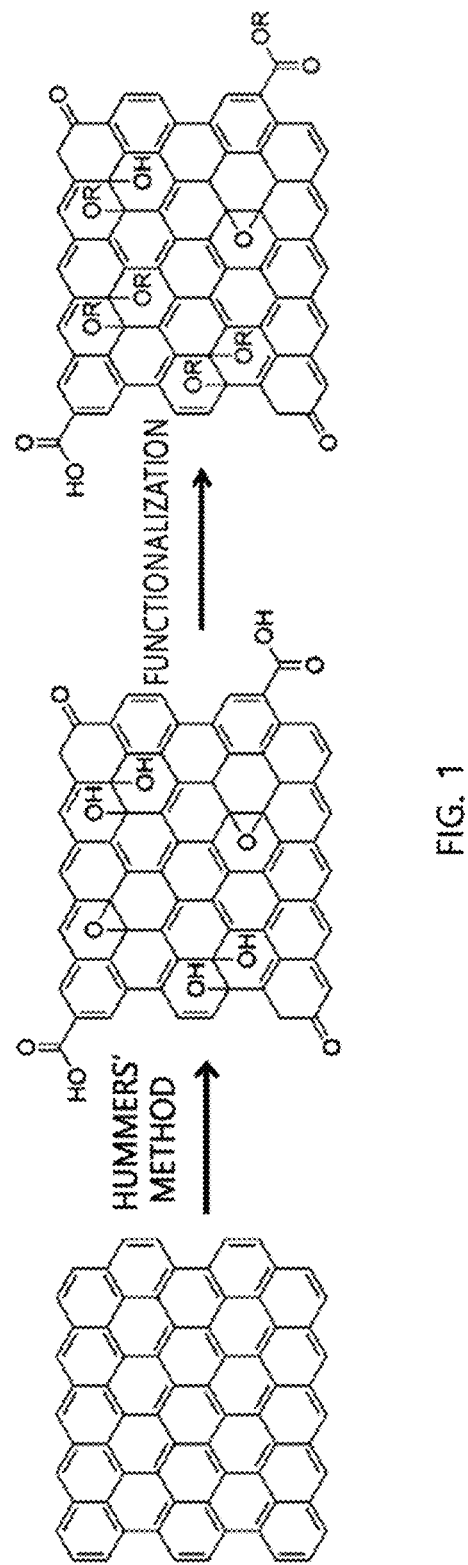
FIG. 1 shows a structure of graphene oxide and functionalized graphene oxide.

Hereinafter, the graphene oxide nanocomposite membrane for gas separation, the reduced graphene oxide nanocomposite membrane and the method for manufacturing the same according to the present invention will be described in detail with reference to the annexed drawings.

First, the present invention provides a graphene oxide nanocomposite membrane for gas separation including a support and a graphene oxide coating layer having nanopores and a thickness of 1 nm to 50 nm disposed on the support.

The support is surface-doped with nitrogen and has a contact angle of 10 to 50°, a surface roughness of 0.1 to 5.0 nm and a surface charge of −20 to +20 mV.

In general, a composite separation membrane has a structure in which a selection layer to improve permeability and selectivity is combined with a support to improve mechanical strength. Currently, research to improve both permeability and selectivity on such a composite separation membrane is mainly underway, and especially, research to improve both permeability and selectivity by coating a support with graphene oxide is underway. However, the graphene oxide is coated on only a certain support and is disadvantageously inapplicable to other various supports, in spite of excellent permeability and selectivity. Furthermore, although, among supports used for composite separation membranes, some supports inherently have excellent permeability and selectivity, it is disadvantageously difficult to coat them with graphene oxide and thus maximize permeability and selectivity. Meanwhile, current graphene oxide has a structure in which a hydrophilic substituent is incorporated in a hydrophobic skeleton and thus has excellent aqueous dispersibility due to various hydrophilic substituents. To coat various supports with hydrophilic graphene oxide, the supports preferably have a contact angle of 10 to 50°. In addition, graphene oxide exhibits superior adhesivity when the support has a flat surface, and a uniform coating layer is formed when the support has a surface roughness of 0.1 to 5.0 nm. Furthermore, graphene oxide has various hydrophilic substituents and is thus strongly negatively charged. Accordingly, as the surface charge of the support becomes neutral, an ideal graphene oxide coating layer or graphene oxide film is formed. When the support has a strongly negatively charged surface, graphene oxide is disadvantageously not coated due to strong charge-charge repulsion and, when the support has a strongly positively charged surface, the structure of graphene oxide is disadvantageously changed due to softness. Accordingly, the support should have a surface charge of −20 to +20 mV to form a uniform graphene oxide coating layer or graphene oxide ultrathin film. In addition, graphene oxide functions as a Lewis acid owing to various hydrophilic functional groups and serves as a Lewis base when doped with nitrogen. In this case, strong adhesion can be obtained based on acid-base reaction.

Accordingly, preferably, the support of the graphene oxide nanocomposite membrane according to the present invention has a surface doped with nitrogen, and has a contact angle of 10 to 50°, a surface roughness of 0.1 to 5.0 nm and a surface charge of −20 to +20 mV. Based on it, physical and chemical properties of the support are improved and various supports can thus be coated with graphene oxide, graphene oxide coated on the supports can also form a uniform coating layer. As such, improved physical properties result from improvement in contact angle, surface roughness and surface charge and improved chemical properties result from doping with nitrogen. A material for the support is not particularly limited so long as it is useful for composite separation membranes and is preferably a metal, ceramic or polymer.

Meanwhile, to selectively separate, collect and concentrate gases, in terms of structure of separation membranes, the separation membrane preferably has an asymmetric structure including a selective separation layer disposed on the surface of the membrane and a porous support having a minimal permeation resistance disposed under the membrane. Furthermore, the separation layer should have no surface defects and be as thin as possible to obtain high gas permeability. Accordingly, most membranes for gas separation are composite membranes including a coating layer formed on the porous polymer support. However, conventional graphene oxide separation membranes provide much faster permeation of carbon dioxide than that of hydrogen having a smaller size than carbon dioxide due to excessively dense structure, and thus exhibit excellent permeability of carbon dioxide and are unsuitable for gas separation membranes for separating hydrogen. Meanwhile, in terms of performance and lifespan of gas separation membranes, gas separation membranes are preferably composite membranes which exhibit superior mechanical strength and thermal and chemical properties. Accordingly, in the present invention, a composite membrane which includes a porous polymer as a support is more preferably used.

The porous polymer support functions as a reinforcing material to support the coating layer, which contacts the coating layer and is made of a polymer which has a sufficient pore size to permeate a gas. The porous polymer support may include any one selected from the group consisting of polysulfone, polyether sulfone, polyimide, polyether imide, polyamide, polyacrylonitrile, cellulose acetate, cellulose triacetate, and polyvinylidene fluoride, without any limitation. Among these substances, polyethersulfone is more preferred. The porous polymer support is not limited to these substances described above.

In addition, the porous polymer support preferably has a fine pore size of 10 nm to 500 nm in order to minimize permeation resistance in a lower part of the separation membrane and permeability of the nanocomposite membrane can be improved by controlling surface pore degree and bulk pore degree.

Next, the graphene oxide coating layer with a thickness of 1 nm to 50 nm which is formed on the porous polymer support and has nanopores according to the present invention will be described in detail.

The graphene oxide used for the present invention can be mass-produced by oxidizing graphite using an oxidant and includes a hydrophilic functional group such as a hydroxyl group, a carboxyl group, a carbonyl group, or an epoxy group. At present, most graphene oxide is manufactured by Hummers' method [Hummers, W. S. & Offeman, R. E. Preparation of graphite oxide. $J.$ $Am.$ $Chem.$ $Soc.$ 80. 1339 (1958)] or a partially modified version of Hummers' method. In the present invention, graphene oxide is obtained by Hummers' method as well.

In addition, the graphene oxide of the present invention may be functionalized graphene oxide in which a hydrophilic functional group such as a hydroxyl group, a carboxyl group, a carbonyl group or an epoxy group present in the graphene oxide is converted into an ester group, an ether group, an amide group or an amino group by chemical reaction with other compound and examples thereof include functionalized graphene oxide in which a carboxyl group of graphene oxide is reacted with alcohol and is thus converted into an ester group, functionalized graphene oxide in which a hydroxyl group of graphene oxide is reacted with alkyl halide and is thus converted into an ester group, functionalized graphene oxide in which a carboxyl group of graphene oxide is reacted with alkyl amine and is thus converted into an amide group, and functionalized graphene oxide in which an epoxy group of graphene oxide is ring-opening reacted with alkyl amine and is thus converted into an amino group.

Regarding the size of graphene oxide, when the size exceeds 5 μm, barrier property is obtained and, as the size gradually decreases from 5 μm to 0.1 μm, gas permeability is gradually increased and is thus suitable for gas separation. The size of graphene oxide is preferably 0.1 μm to 5 μm, more preferably, 0.3 μm to 1 μm. FIG. 1 shows a structure of graphene oxide obtained by Hummers' method from graphite and a structure of functionalized graphene oxide produced by reacting graphene oxide with other compound.

Meanwhile, according to the present invention, the graphene oxide coating layer formed on a porous polymer support includes graphene oxide having a single layer or multiple layers, graphene oxide having a single layer has a thickness of 0.6 nm to 1 nm. In addition, graphene oxide having a single layer may be laminated to form graphene oxide having multiple layers. An additional movement route is formed between grain boundaries due to small distance between graphene oxide layers of about 0.34 nm to 0.5 nm, and selectivity for separating a certain substance can be improved by controlling the pore and channel size between grain boundary gaps. Such graphene oxide with multiple layers increases a diffusion passage of substances and thus improves a permeation rate ratio between two substances to be separated, thereby further enhancing selectivity as the number of layers increases. Accordingly, the graphene oxide coating layer more preferably includes graphene oxide having multiple layers.

The graphene oxide coating layer preferably has a total thickness of 1 nm to 50 nm. This is because, when the total thickness of the coating layer is less than 1 nm, graphene oxide is not sufficiently coated and permeability of hydrogen may be deteriorated and when the total thickness of coating layer exceeds 50 nm, permeation resistance is increased, permeability of hydrogen and carbon dioxide are decreased and selectivity of hydrogen compared to carbon dioxide is thus decreased. For this reason, in order to improve both permeability of hydrogen and selectivity of hydrogen compared to carbon dioxide, the total thickness of graphene oxide coating layer is controlled within the range of 1 nm to 50 nm. Furthermore, the coating layer forms nanopores having an average diameter of 0.5 nm to 2.0 nm.

In addition, the present invention provides a method of manufacturing a graphene oxide nanocomposite membrane for gas separation including i) preparing a dispersion of graphene oxide in distilled water, ii) treating the dispersion with an ultrasonic grinder for 0.1 to 6 hours, and iii) coating a support with the ultrasonicated solution to form a coating layer.

Furthermore, the method of the present invention may further include treating the support with plasma and doping with nitrogen before forming the coating layer. As a result, pre-treatment by surface-modification of the support is involved and a graphene oxide nanocomposite membrane for gas separation in which adhesion force between the support and the graphene oxide coating layer is improved and the graphene oxide coating layer is not easily detached can be obtained.

In step i), the graphene oxide has a size of 0.1 μm to 5 μm and may be functionalized graphene oxide in which a hydroxyl group, a carboxyl group, a carbonyl group or an epoxy group present in graphene oxide is converted into an ester group, an ether group, an amide group, or an amino group.

In addition, in step i), the dispersion is a 0.01 to 0.5 wt % aqueous graphene oxide solution which has pH adjusted to 10.0 with a 1M aqueous sodium hydroxide solution. When the concentration of the aqueous graphene oxide solution is less than 0.01 wt %, it is disadvantageously difficult to obtain the uniform coating layer and, when the concentration exceeds 0.5 wt %, coating cannot be disadvantageously efficiently conducted due to excessively high viscosity. Thus, the aqueous graphene oxide solution preferably has a concentration of 0.01 to 0.5 wt %.

In addition, in step ii), dispersibility of graphene oxide can be improved by treating the graphene oxide dispersion with an ultrasonic grinder for 0.1 to 6 hours.

In addition, in step iii), preferably, the support is a porous polymer support and the porous polymer support is selected from the group consisting of polysulfone, polyether sulfone, polyimide, polyether imide, polyamide, polyacrylonitrile, cellulose acetate, cellulose triacetate and polyvinylidene fluoride and has a pore size of 10 nm to 500 nm because permeation resistance formed in the lower part of the separation membrane can be minimized.

In step iii), any well-known coating method may be used for forming the coating layer without imitation and the coating method is preferably selected from the group consisting of direct evaporation, transfer, spin coating method, and spray coating. Among these methods, spin coating is more preferable because a uniform coating layer can be easily obtained.

Spin coating is preferably conducted 3 to 10 times. When spin coating is conducted less than three times, the function of a selective separation layer cannot be obtained and, when the spin coating is conducted 10 times or more, permeability is significantly deteriorated due to excessively thick coating layer.

In step iii), the coating layer may include graphene oxide with a single or multiple layers and the graphene oxide with a single layer may have a thickness of 0.6 nm to 1 nm.

In addition, the present invention provides a reduced graphene oxide nanocomposite membrane for hydrogen separation which is obtained by reducing the prepared graphene oxide nanocomposite membrane for hydrogen separation by vapor reduction. The vapor reduction is carried out by incorporating a solution containing hydroiodic acid (HI) and acetic acid mixed in a ratio of 2:5 in a reactor and reacting hydroiodic acid (HI) vapor with the graphene oxide nanocomposite membrane at 30 to 40° C. for 12 to 24 hours.

MODE FOR INVENTION

Hereinafter, specific examples will be described in detail.

Example 1

Figure 2:
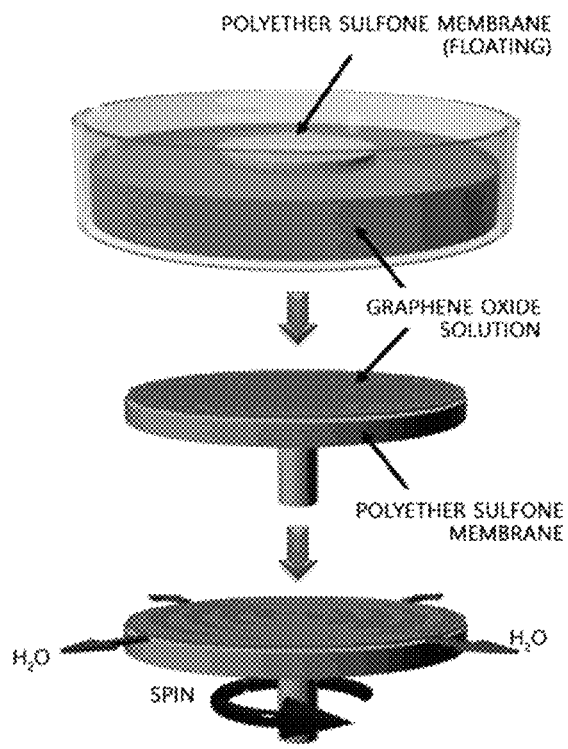
FIG. 2 shows spin coating of a graphene oxide nanocomposite membrane according to the present invention.

An aqueous graphene oxide solution, which has a pH adjusted to 10.0 using 0.1 wt % of 1M aqueous sodium hydroxide solution, was obtained from graphene oxide prepared by Hummers' method. The aqueous solution containing the graphene oxide dispersed therein was treated with an ultrasonic grinder for 6 hours and a polyethersulfone (PES) support was spin-coated with 1 mL of the graphene oxide dispersion 5 times to produce a nanocomposite membrane (GO membrane) having a graphene oxide coating layer formed thereon, as shown in FIG. 2.

Example 2

A solution containing hydroiodic acid (HI) and acetic acid mixed in a ratio of 2:5 was incorporated in a reactor and hydroiodic acid (HI) vapor was reacted with the graphene oxide nanocomposite membrane produced in Example 1 at 40° C. for 24 hours to produce a reduced graphene oxide nanocomposite membrane (rGO membrane) by vapor reduction.

Examples 3 To 6

Graphene oxide nanocomposite membranes were produced in the same manner as in Example 1, except that polyethersulfone (PES) [Example 3], polysulfone (PSF) [Example 4], polyacrylonitrile (PAN) [Example 5] and polyvinylidene fluoride (PVDF) [Example 6] were used as supports, the supports were treated with oxygen plasma at 50 W for 3 minutes and the surfaces of the supports were pre-treated by spin-coating with a polyetherimide (PEI) or polyvinyl pyrrolidone (PVP) solution (5 wt %) as a nitrogen atom-containing substance to dope the surfaces with nitrogen.

Comparative Example

A graphene oxide nanocomposite membrane was produced in the same manner as in Example 4, except that the surface of a polysulfone (PSF) support was not pre-treated.

Measurement Example

Images of the nanocomposite membranes produced in Examples 1 and 2 were obtained with a camera and the coating layer was observed with a scanning electron microscope (SEM) and an atomic force microscope (AFM). In addition, the thickness of the graphene oxide coating layer was measured using a transmission electron microscope (TEM) and reduction of the graphene oxide by vapor reduction was confirmed by X-ray photoelectron spectroscopy (XPS) surface analysis. In addition, pre-treatment of the support surface was confirmed by measurement of contact angle and infrared spectroscopy.

Test Example

Gas permeability and selectivity of nanocomposite membranes produced in Example and Comparative Example were measured by a constant pressure/variable volume gas measurement method.

Figure 3:
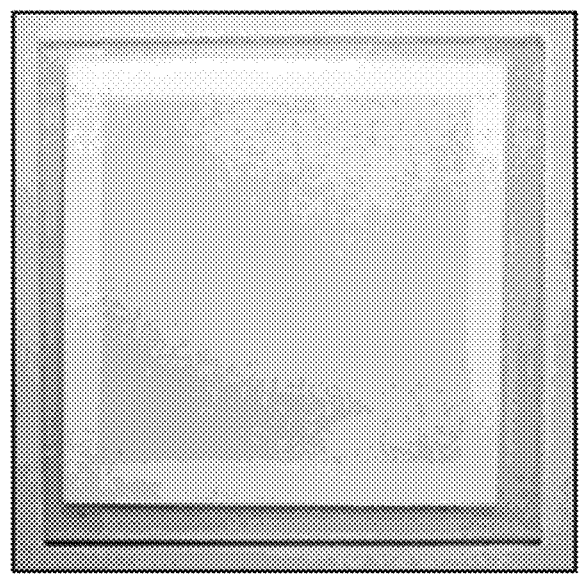
FIG. 3 is an image showing a graphene oxide nanocomposite membrane produced in Example 1.

From the camera image of FIG. 3, it can be seen that the graphene oxide nanocomposite membrane produced in Example 1 includes a graphene oxide coating layer formed on a polyethersulfone porous support.

Figure 4:
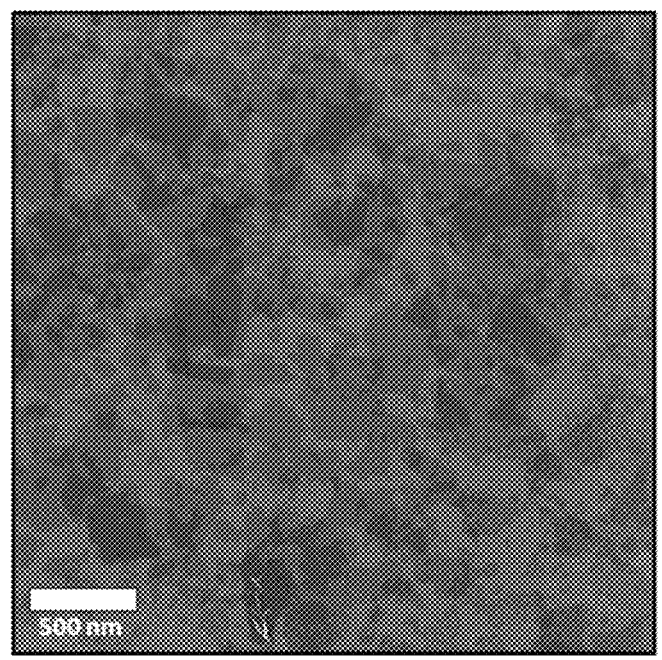
FIG. 4 is a scanning electron microscope image showing a surface of the graphene oxide nanocomposite membrane produced in Example 1.
Figure 5:
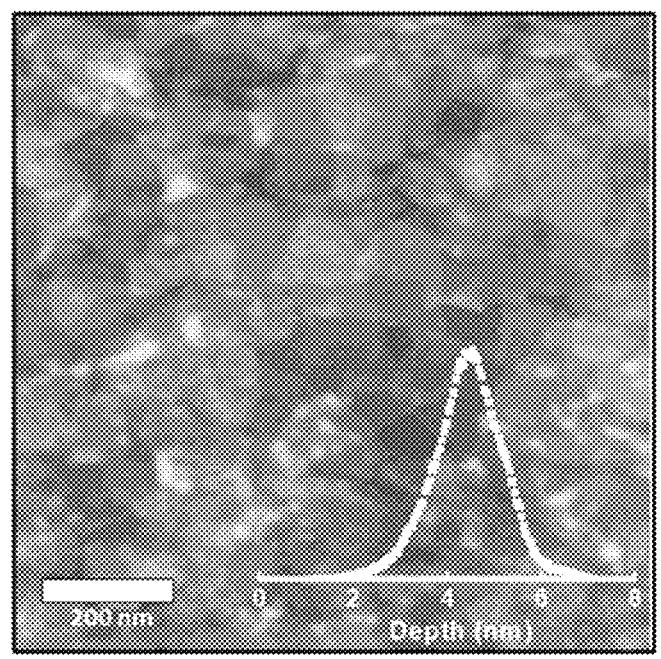
FIG. 5 is an atomic force microscope image showing a surface of graphene oxide nanocomposite membrane produced in Example 1.

In addition, as can be seen from the surface image of FIG. 4, obtained by a scanning electron microscope, showing the graphene oxide nanocomposite membrane produced in Example 1, and the surface image of FIG. 5, obtained by an atomic force microscope, showing the graphene oxide nanocomposite membrane produced in Example 1, the graphene oxide coating layer was uniformly coated on the polyethersulfone porous support without any defects.

Figure 6:
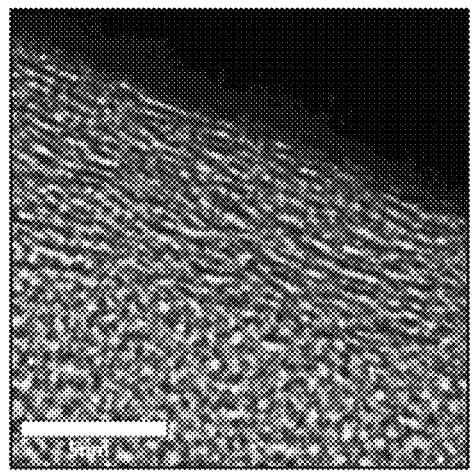
FIG. 6 is a transmission electron microscope image showing a cross-section of the graphene oxide nanocomposite membrane produced in Example 1.

Furthermore, as can be seen from the cross-sectional image of FIG. 6, obtained by a transmission electron microscope, showing the graphene oxide nanocomposite membrane for hydrogen separation produced in Example 1, the thickness of the graphene oxide coating layer was 10 nm or less, which means that an ultrathin film of graphene oxide coating layer was formed on the polyethersulfone porous support. In addition, rather than Example 1, as a result of spin coating 3 to 10 times, the thicknesses of the coating layers generally ranged from 3 nm to 7 nm, which indicates that ultrathin films of graphene oxide coating layers were stably formed.

Figure 7:
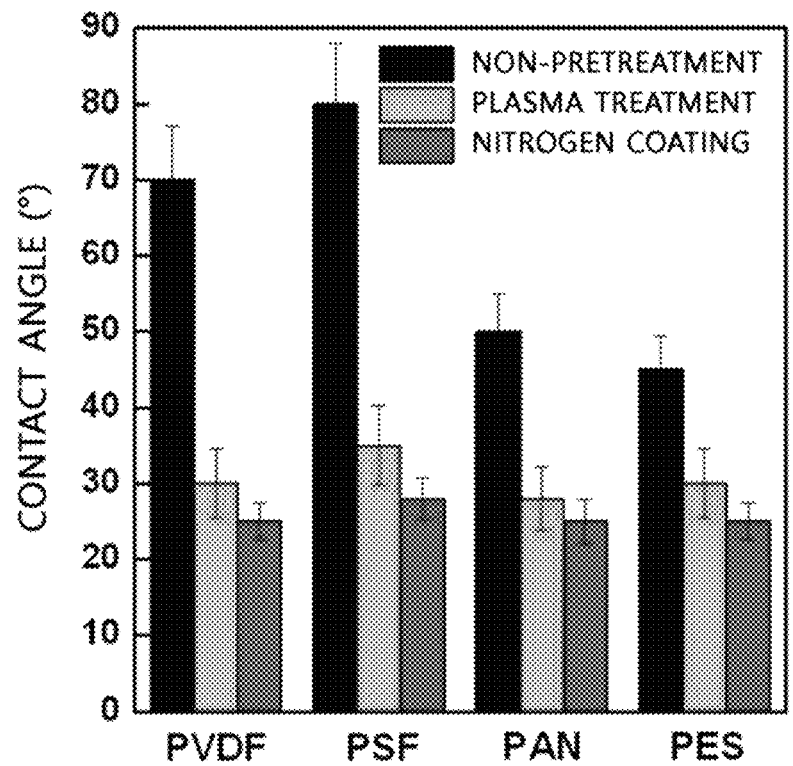
FIG. 7 is a graph showing measurement results of contact angles for supports subjected to surface pre-treatment in Examples 3 to 6 and supports not subjected to surface pre-treatment.
Figure 8:
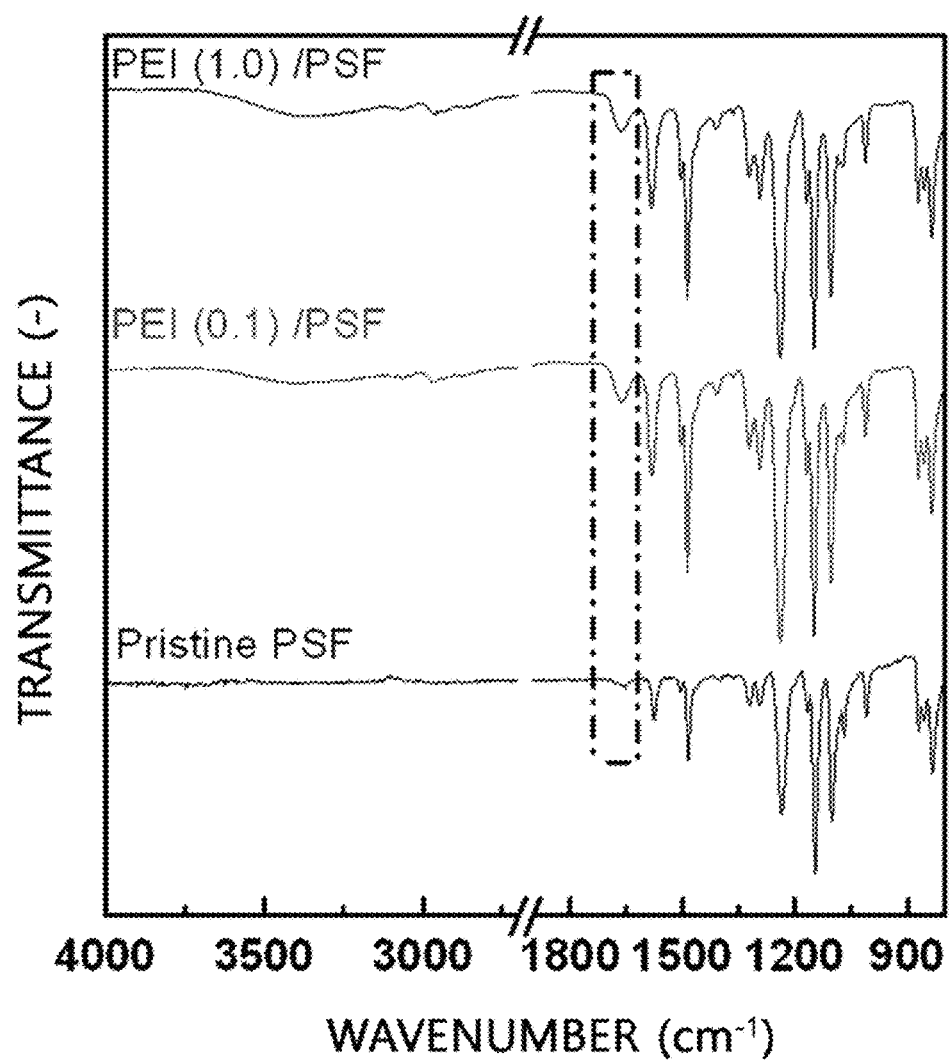
FIG. 8 is an infrared spectroscopy spectrum confirming pre-treatment of the support surface according to Example 4.

FIG. 7 is a graph showing measurement results of contact angles for supports subjected to surface pre-treatment according to Examples 3 to 6 and supports not subjected to surface pre-treatment. The supports subjected to surface pre-treatment according to Examples 3 to 6 had lower contact angles than the supports not subjected to surface pre-treatment. Especially, when the surfaces of plasma-treated supports are doped with nitrogen, the supports doped with nitrogen have a lower contact angle than supports not doped with nitrogen. This means that the support surface is more hydrophilic. In addition, as shown in FIG. 8, in a case in which a polysulfone (PSF) support surface is treated with plasma and then doped with nitrogen, more specifically, polyetherimide (PEI) containing a nitrogen atom according to Example 4, presence of characteristic peak of an imide group can be seen from the infrared spectroscopy spectrum, which means that nitrogen doping was conducted.

Figure 9:
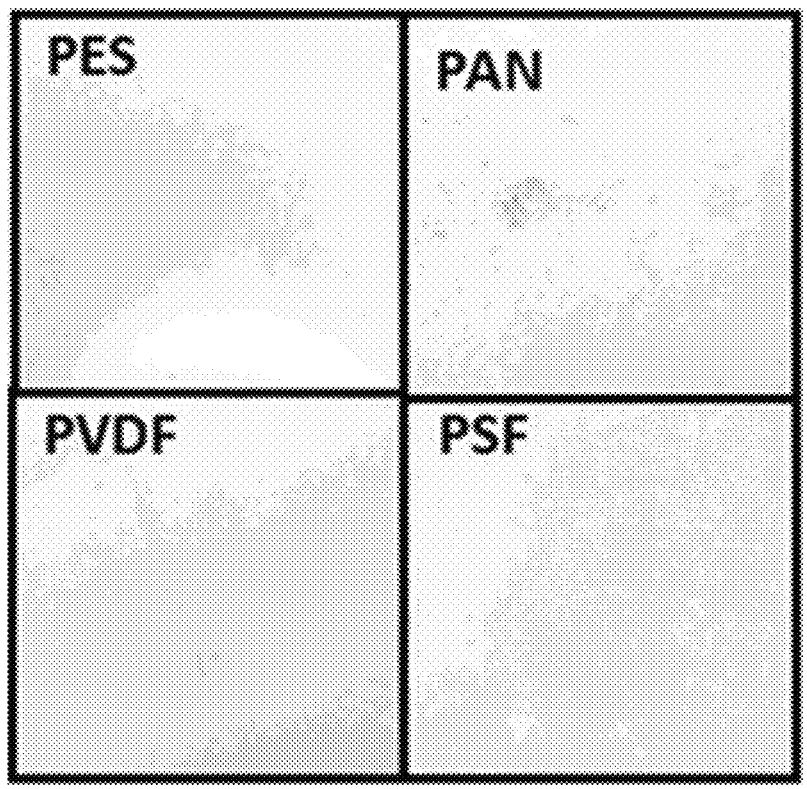
FIG. 9 is a camera image showing the graphene oxide nanocomposite membranes produced in Examples 3 to 6.
Figure 10:
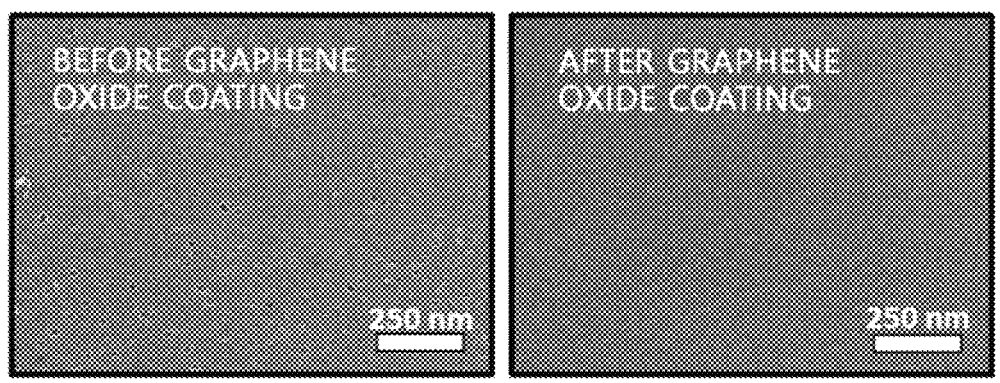
FIG. 10 is a scanning electron microscope image comparing the surfaces before and after coating graphene oxide prepared in Example 4.

In addition, as can be seen from a camera image of FIG. 9 showing the graphene oxide nanocomposite membranes produced in Examples 3 to 6, and an image obtained with a scanning electron microscope of FIG. 10 showing comparison between the surfaces before and after coating graphene oxide prepared in Example 4, graphene oxide was uniformly coated on various porous polymer supports.

Figure 11:
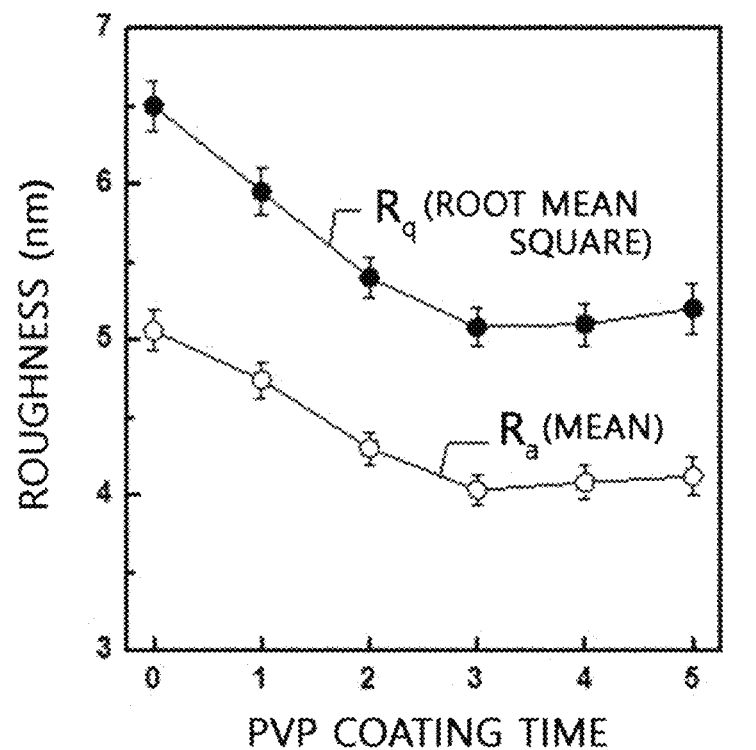
FIG. 11 is a graph showing surface roughness, hydrophilicity and surface charge characteristics after pre-treatment of the support surface according to Example 4.
Figure 11:
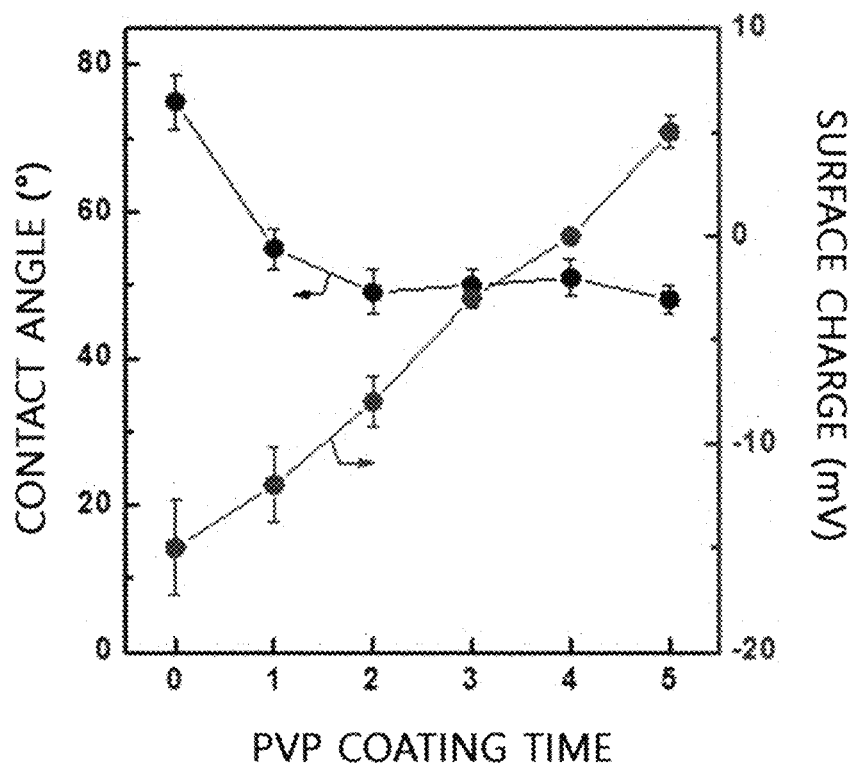

In addition, FIG. 11 shows surface roughness, hydrophilicity and surface charge of the support after pre-treatment of the support surface according to Example 4. After pre-treatment including treating the support surface with plasma and doping the same with nitrogen, the support had a uniform and hydrophilic surface and charge of the surface was gradually neutralized.

Figure 12:
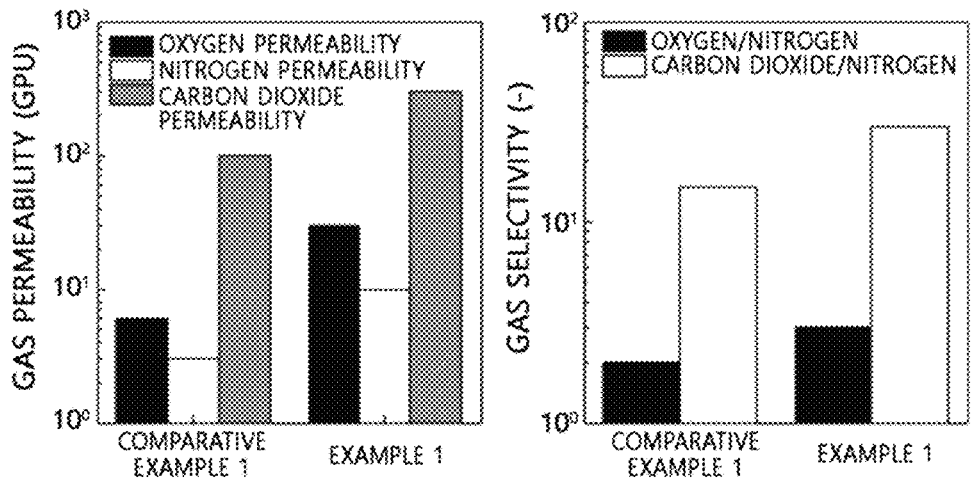
FIG. 12 is a graph showing gas permeability and selectivity of graphene oxide nanocomposite membranes produced in Example 4 and Comparative Example.

In addition, as can be seen from the graph of FIG. 12, showing gas permeability and selectivity of graphene oxide nanocomposite membranes produced in Example 4 and Comparative Example, the graphene oxide nanocomposite membrane produced in Example 4 exhibited superior oxygen, nitrogen and carbon dioxide permeability to the graphene oxide nanocomposite membrane produced in Comparative Example and exhibited superior selectivity of oxygen compared to nitrogen and superior selectivity of carbon dioxide compared to nitrogen to the graphene oxide nanocomposite membrane produced in Comparative Example. This means that both gas permeability and selectivity of the graphene oxide nanocomposite membrane can be further improved by pre-treatment including treating the support surface with plasma and doping the same with nitrogen according to the present invention.

Figure 13:
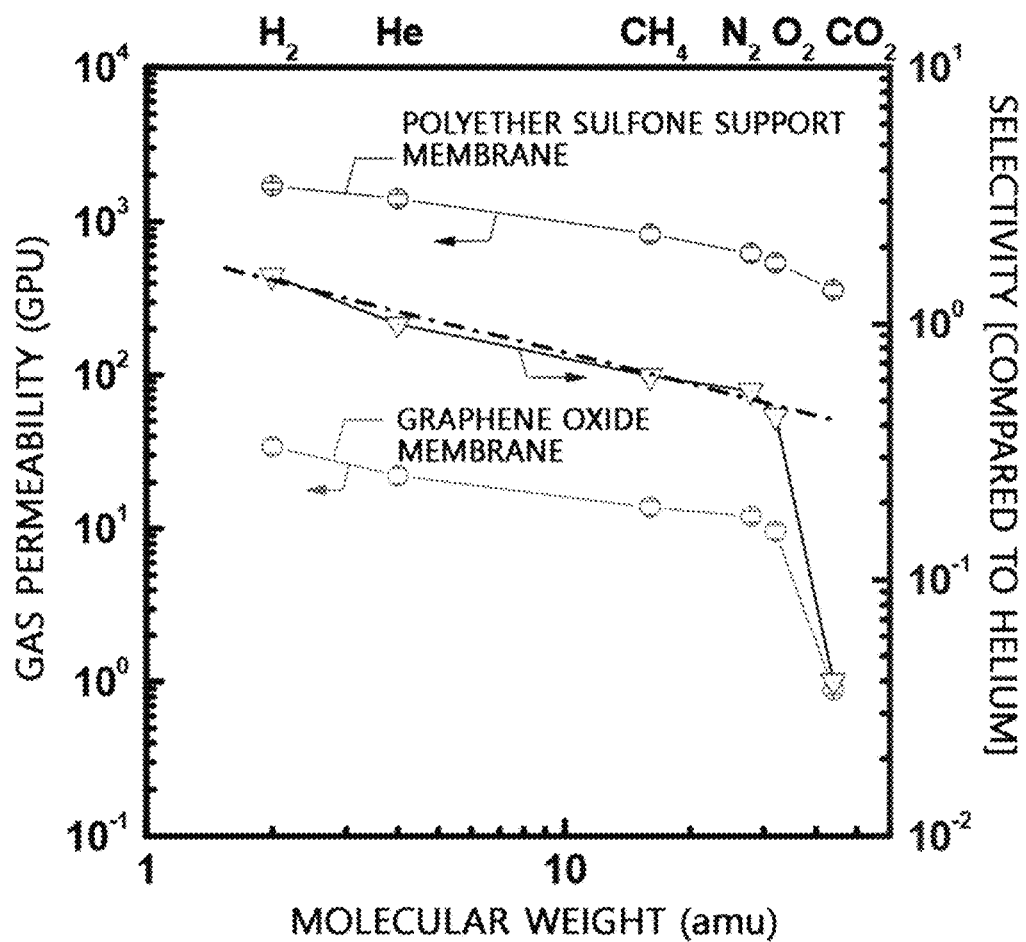
FIG. 13 is a graph showing gas permeability for a porous support (PES) membrane (pristine membrane) having no coating layer and a graphene oxide nanocomposite membrane produced in Example 1.
Figure 14:
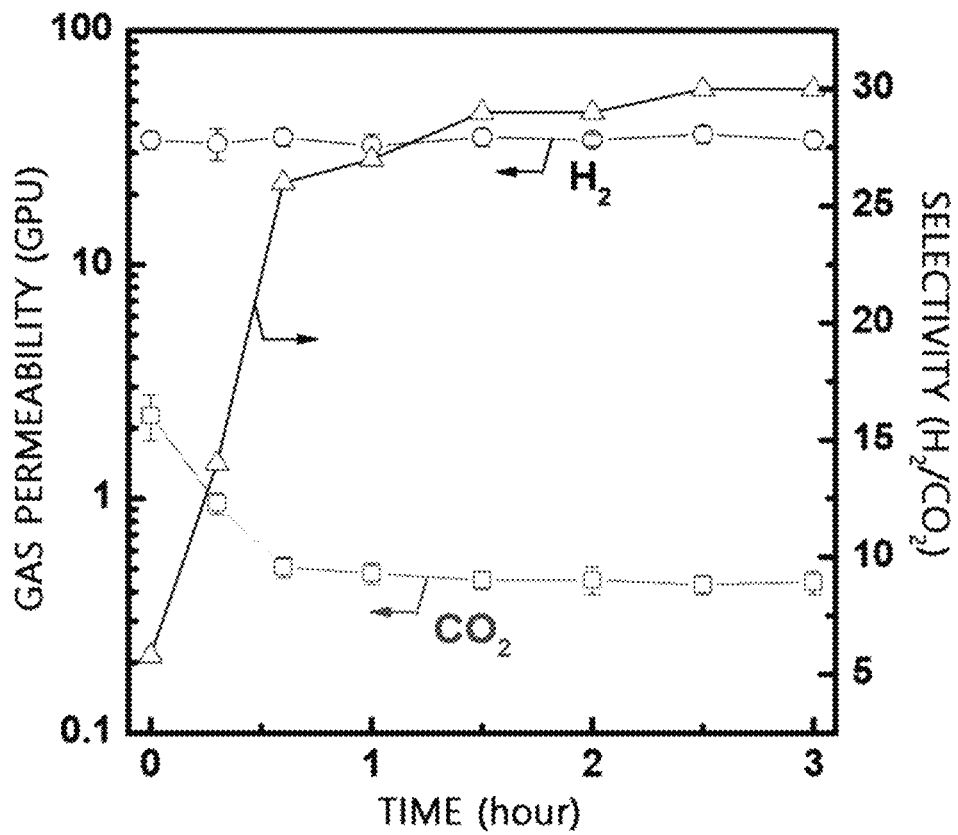
FIG. 14 is a graph showing hydrogen, carbon dioxide permeability and selectivity of hydrogen compared to carbon dioxide over time for the graphene oxide nanocomposite membrane produced in Example 1.

Meanwhile, FIG. 13 shows gas permeability of a porous support (PES) membrane (pristine membrane) having no coating layer and a graphene oxide nanocomposite membrane (GO membranes) prepared in Example 1. As can be seen from FIG. 13, the porous support (PES) membrane having no coating layer has no great difference in permeability between hydrogen, helium, methane, nitrogen, oxygen and carbon dioxide, whereas the graphene oxide nanocomposite membrane in Example 1 has much lower carbon dioxide permeability than hydrogen permeability. As can be seen from FIG. 14, selectivity of hydrogen compared to carbon dioxide is significantly increased over time.

Figure 15:
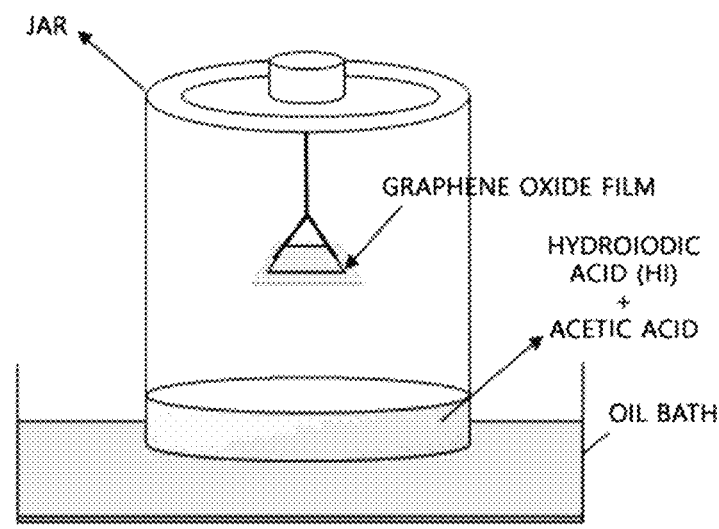
FIG. 15 is a schematic view illustrating a process of manufacturing a reduced graphene oxide nanocomposite membrane according to Example 2 by vapor reduction.
Figure 16:
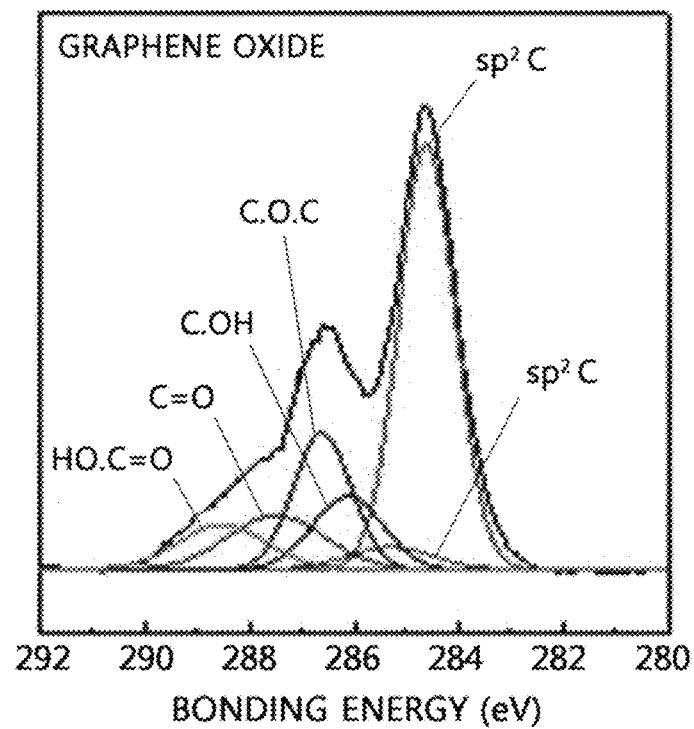
FIG. 16 is an X-ray photoelectron spectroscopy surface analysis graph showing graphene oxide of Example 1 and graphene oxide of Example 2.
Figure 16:
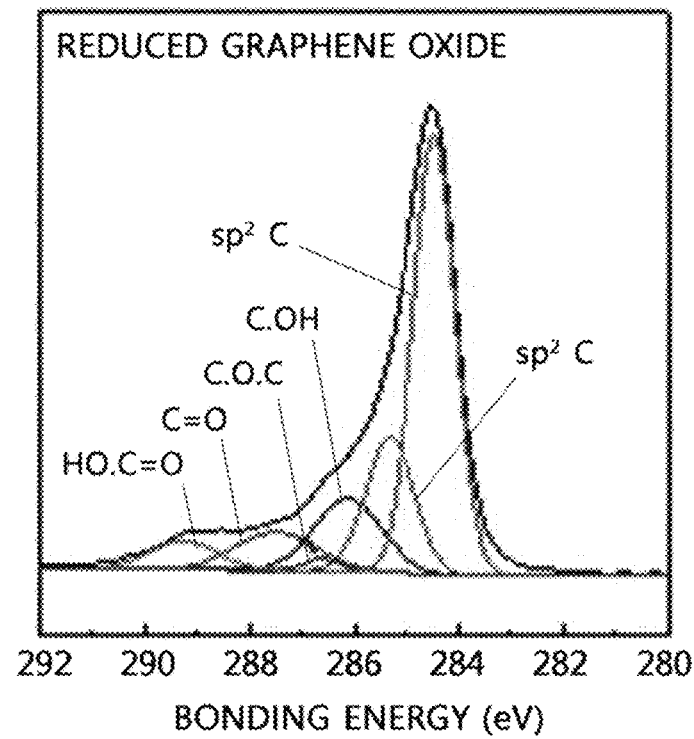

Especially, the reduced graphene oxide nanocomposite membrane (rGO membranes) obtained by vapor-reducing the graphene oxide nanocomposite membrane produced in Example 1 using a reactor, shown in FIG. 15, was reduced, as can be seen from the X-ray photoelectron spectroscopy surface analysis graph of FIG. 16.

Figure 17:
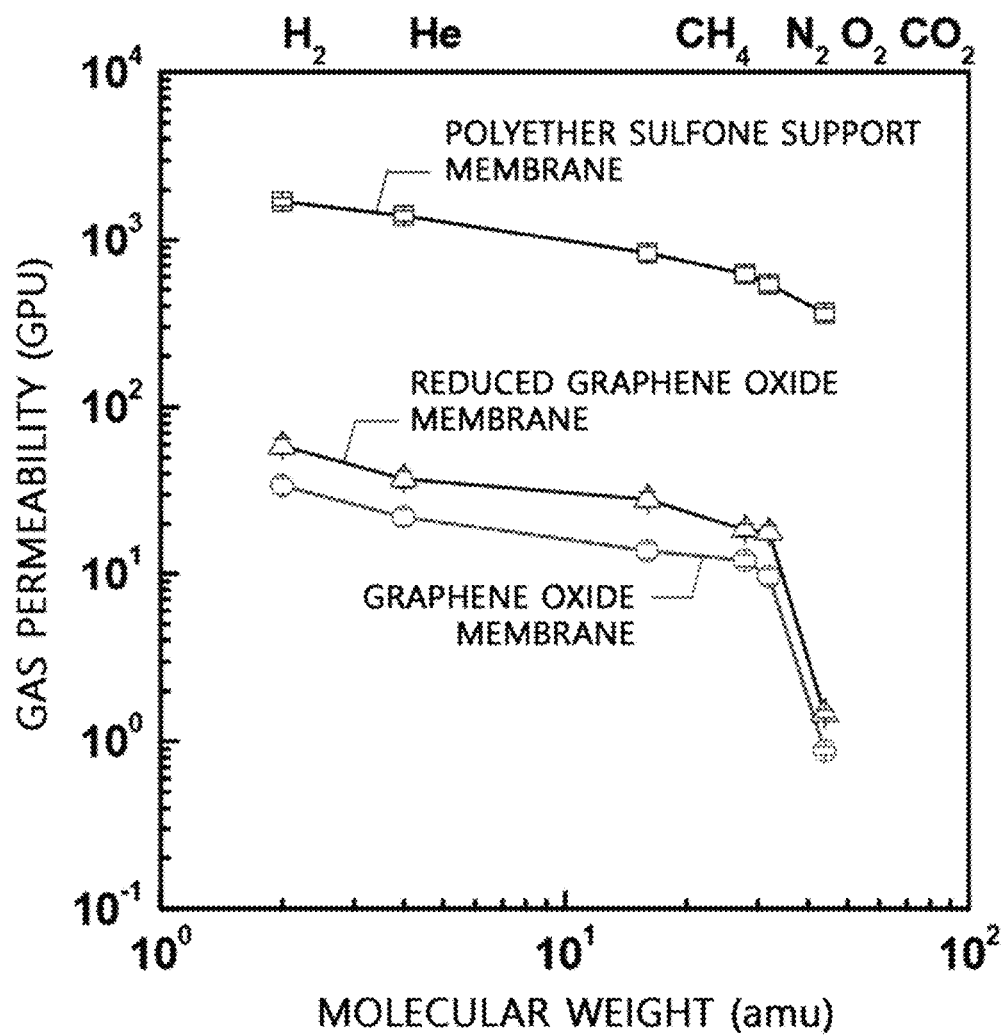
FIG. 17 is a graph showing gas permeability of a porous support (PES) membrane having no coating layer, a graphene oxide nanocomposite membrane produced in Example 1 and a reduced graphene oxide nanocomposite membrane produced in Example 2.
Figure 18:
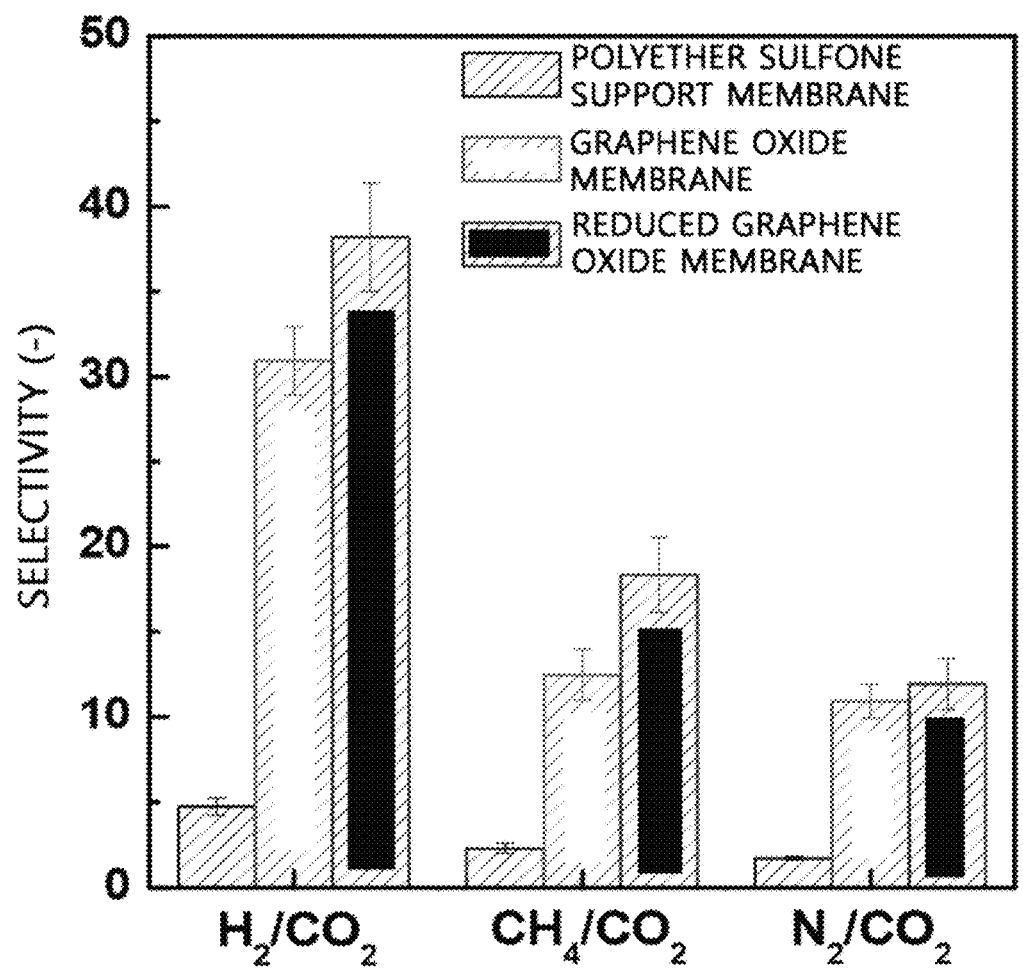
FIG. 18 is a graph showing hydrogen/carbon dioxide selectivity of the porous support (PES) membrane having no coating layer, the graphene oxide nanocomposite membrane produced in Example 1 and the reduced graphene oxide nanocomposite membrane produced in Example 2.

Furthermore, as can be seen from the graphs of FIGS. 17 and 18, the reduced graphene oxide nanocomposite membranes exhibited superior hydrogen permeability and selectivity of hydrogen compared to carbon dioxide as compared to unreduced graphene oxide nanocomposite membranes.

INDUSTRIAL APPLICABILITY

The graphene oxide nanocomposite membrane for gas separation of the present invention has excellent gas permeability and selectivity at the same time, and especially, excellent hydrogen gas permeability and selectivity of hydrogen gas compared to carbon dioxide, and the reduced graphene oxide nanocomposite membrane has remarkably enhanced hydrogen gas permeability and selectivity of hydrogen gas compared to carbon dioxide. Thus, these membranes are applicable as gas separation membranes in an industrial field involving a hydrogen separation process.

Furthermore, a graphene oxide nanocomposite membrane for gas separation can be provided, in which strong bonding force between a support and a graphene oxide coating layer is induced by modifying surfaces of various supports and thus the graphene oxide coating layer is not easily delaminated.

The invention claimed is:

1. A graphene oxide nanocomposite membrane for gas separation comprising:
    a support; and
    a graphene oxide coating layer with a thickness of 1 nm to 50 nm disposed on the support and having nanopores, wherein the support is surface-doped with nitrogen and has a contact angle of 10 to 50°, a surface roughness of 0.1 to 5.0 nm and a surface charge of −20 to +20 mV.

2. The graphene oxide nanocomposite membrane for gas separation according to claim 1, wherein the support is a porous polymer support, which is selected form the group consisting of polysulfone, polyether sulfone, polyimide, polyether imide, polyamide, polyacrylonitrile, cellulose acetate, cellulose triacetate, and polyvinylidene fluoride.

3. The graphene oxide nanocomposite membrane for gas separation according to claim 1, wherein the porous polymer support has a pore size of 10 nm to 500 nm.

4. The graphene oxide nanocomposite membrane for gas separation according to claim 1, wherein the graphene oxide has a size of 0.1 μm to 5 μm.

5. The graphene oxide nanocomposite membrane for gas separation according to claim 1, wherein the nanopores have a mean diameter of 0.5 nm to 2.0 nm.

6. A method of manufacturing a graphene oxide nanocomposite membrane for gas separation comprising:
    i) preparing a dispersion of graphene oxide in distilled water;
    ii) treating the dispersion with an ultrasonic grinder for 0.1 to 6 hours; and
    iii) coating a support with the ultrasonicated solution to form a coating layer.

7. The method according to claim 6, further comprising treating the support with plasma and doping with nitrogen before forming the coating layer.

8. The method according to claim 6, wherein the dispersion is a 0.01 to 0.5 wt % aqueous graphene oxide solution having a pH adjusted to 10.0 using a 1M aqueous sodium hydroxide solution.

9. The method according to claim 6, wherein the coating is carried out by any one method selected from the group consisting of direct evaporation, transfer, spin coating and spray coating.

10. The method according to claim 9, wherein the spin coating is conducted three to ten times.

* * * * *